(12) United States Patent
Decrocq et al.

(10) Patent No.: US 8,056,369 B2
(45) Date of Patent: Nov. 15, 2011

(54) DEVICE FOR FORMING FIBER FELTS

(75) Inventors: Francois Decrocq, Orange (FR); Oleg Boulanov, Nogent sur Oise (FR); Manivannane Pourouchottamane, Chelles (FR); Daniel Lacaute, Orry la Ville (FR)

(73) Assignee: Saint-Gobain Isover, Courbevoie (FR)

( * ) Notice: Subject to any disclaimer, the term of this patent is extended or adjusted under 35 U.S.C. 154(b) by 783 days.

(21) Appl. No.: 11/721,164

(22) PCT Filed: Dec. 7, 2005

(86) PCT No.: PCT/FR2005/051056
§ 371 (c)(1),
(2), (4) Date: Jun. 8, 2007

(87) PCT Pub. No.: WO2006/061545
PCT Pub. Date: Jun. 15, 2006

(65) Prior Publication Data
US 2009/0246369 A1 Oct. 1, 2009

(30) Foreign Application Priority Data
Dec. 9, 2004 (FR) ..................................... 04 52908

(51) Int. Cl.
*C03B 37/06* (2006.01)

(52) U.S. Cl. ................ 65/454; 65/458; 65/460; 65/461; 65/464; 65/467; 65/478; 65/517; 65/524

(58) Field of Classification Search ............ 65/454–456, 65/458–462, 464–467, 469–470, 475, 478, 65/505, 517, 524
See application file for complete search history.

(56) References Cited

U.S. PATENT DOCUMENTS

| | | | | | |
|---|---|---|---|---|---|
| 3,219,425 | A | * | 11/1965 | Stalego | 65/461 |
| 3,902,878 | A | * | 9/1975 | Hoag et al. | 65/447 |
| 3,969,099 | A | * | 7/1976 | Reese | 65/471 |
| 4,224,373 | A | * | 9/1980 | Marzocchi | 442/355 |
| 4,300,931 | A | * | 11/1981 | Phillips | 65/458 |
| 4,478,624 | A | * | 10/1984 | Battigelli et al. | 65/458 |
| 4,544,393 | A | * | 10/1985 | Bilen | 65/461 |
| 4,670,034 | A | * | 6/1987 | Goodridge et al. | 65/461 |
| 5,693,117 | A | * | 12/1997 | Watton | 65/461 |
| 2007/0227196 | A1 | * | 10/2007 | Boulanov | 65/528 |

\* cited by examiner

*Primary Examiner* — Queenie Dehghan
(74) *Attorney, Agent, or Firm* — Oblon, Spivak, McClelland, Maier & Neustadt, L.L.P.

(57) ABSTRACT

Device intended for an installation for forming fibrous felts, the fibers being formed from a material that can be attenuated by internal centrifugation and by attenuation by means of a gas stream, the flow of fibers being in the form of a tubular veil, the device including air blowing means that expel air tangentially to the tubular veil so as to impress a rotational movement on the veil, wherein the blowing means deliver air in a direction perpendicular to the main direction of the flow of the tubular veil.

25 Claims, 4 Drawing Sheets

DEVICE FOR FORMING FIBER FELTS

BACKGROUND OF THE INVENTION

I. Field of the Invention

The invention relates to the formation of fibrous felts such as those intended for thermal and acoustic insulation, and it relates more particularly to a device for improving the distribution of the fibers that are collected on a receiving member.

II. Description of Related Art

The formation of fibers, especially mineral fibers such as glass fibers, results from a fiberizing process consisting in attenuating the material, such as glass, by centrifugation and by the action of high-temperature gas streams.

The fiberizing process commonly used today is what is called the internal centrifugation process. It consists in introducing a stream of attenuable material in the molten state in a spinner, also called a fiberizing dish, rotating at high speed and pierced around its periphery by a very large number of holes via which the material is ejected in the form of filaments owing to the centrifugal force. By means of an annular burner, these filaments are then subjected to the action of an annular stream of high-temperature high-velocity attenuating gas that hugs the wall of the spinner, reducing the diameter of the filaments and converting them into fibers.

Moreover, the attenuating gas stream is generally confined by means of a surrounding cold gas sheath, suitably channeling it in the form of a tubular flow. This gas sheath is produced by a blowing ring that surrounds the annular burner. Being cold, this gas sheath also helps to cool the fibers, the mechanical strength of which is thus probably improved by a thermal quenching effect.

It is also common practice to add an annular inductor beneath the centrifugation device in order to help to maintain thermal equilibrium of the spinner. This inductor heats the bottom of the peripheral band of the spinner, which bottom is heated less by the attenuating gas as it is further away from the annular burner and is cooled by the ambient air.

The fibers formed are entrained by the attenuating gas stream toward a receiving belt generally consisting of a gas-permeable belt onto which the fibers are entangled in the form of a blanket.

To fix the fibers together, a binder is generally sprayed onto the fibers during their path towards the receiving belt. The binder is sprayed for example by means of a ring that surrounds the gas stream and has a plurality of spray holes.

The binder is then cured, for example by a heat treatment beyond the receiving belt.

One of the difficulties encountered in preparing these felts is due to the distribution of the fibers within the entire felt, which distribution is desired to be the most uniform possible. Any irregularity in the distribution may result in a local density lower than the desired density, this generally being corrected during manufacture by increasing the mean density of felt. However, it always desirable to reduce the density of a product in order to make it lighter while obtaining just as good insulation, particularly thermal insulation, performance. The aim is therefore continually to make the distribution of the fibers in the felt as homogeneous as possible on a production line.

A known means for improving the fiber distribution is the use of a device called a "bucket", as described in patent application FR 2 544 754, which consists of a guiding duct placed in the path of the gas stream beneath the spinner and above the binder spray device. This duct channels the fibers—it undergoes an oscillatory movement in order to direct the flow of fibers alternately from one edge of the fiber-receiving belt to the other.

However, this solution has a tendency to degrade the properties of the fibers by a rubbing effect during their impact on the walls of the bucket device.

Another known means consists in blowing air, toward the tubular gas flow, substantially perpendicularly in order to pass through it.

Patent FR 1 244 530 thus describes two nozzles that are placed above the binder spray device and diametrically opposite the gas flow, and the air jets of which are actuated in turn in order to impress on the veil of fibers a to-and-fro movement when it is being deposited on the receiving belt.

U.S. Pat. No. 4,266,960 shows two devices, which each deliver a flat jet of air arriving at high velocity perpendicular to and in the tubular gas flow, the two devices being placed on either side of the gas flow so that the orientation of the air jets ensures that the tubular flow separates into several divergent flows.

These blowing means therefore constrain the air to be directed so as to be approximately perpendicular to the tubular sheath of fibers, in order to divide the tubular flow and/or to modify its orientation. However, these means run the risk of creating holes in the veil at the moment of impact of the air jet, which in the end does not optimize a uniform distribution of the fibers on the receiving belt.

Furthermore, one of the risks associated with using these means is that they are very difficult to regulate by an operator.

Finally, document FR 2 510 909 discloses a method for improving the fiber distribution, which consists in creating a gas sheath directed so as to hug the tubular veil carrying the fibers around its periphery by enveloping it, the flow direction of this gas sheath in the plane tangential to the tubular veil making an angle to the flow direction of the veil of between 10 and 60°.

The device for implementing this method consists of a blowing ring comprising an annular chamber, the base of which conducts a pressurized gas so as to generate a gas sheath. In one arrangement, the base of the chamber has, in a first embodiment, inclined holes or else, in another embodiment, a continuous slot, the flow direction being provided by inclined fins placed at regular intervals in this slot along the path of the gas sheath.

However, this type of device blows air tangentially to the fibers from the base of the chamber, at an angle of between 10 and 60° relative to the flow of the tubular sheath, and in the region or the end of the region where the fibers are attenuated, thereby preventing adjustment of the distribution, which is independent of the quality of the fiber obtained.

BRIEF SUMMARY OF THE INVENTION

The object of the invention is therefore to provide a device for manufacturing fiber felts with a view to improving the distribution of the fibers in a felt, in particular while maintaining the required quality of the fibers upon being attenuated, this device not having the drawbacks of the prior art, while making it possible to obtain uniform felts of the desired density, in order to achieve a given thermal or insulating performance.

According to the invention, the device, intended for an installation for forming fibrous felts that are formed from a material that can be attenuated by internal centrifugation and by attenuation by means of a gas stream, the flow of fibers being in the form of a substantially tubular veil, this device including air blowing means that expel air tangentially to the veil so as to impress a rotational movement thereon, is characterized in that the blowing means supply air in a direction perpendicular to the main direction of the flow of the veil.

The expression "in a direction perpendicular to the main direction of the flow" is understood to mean that the velocity of the gases has a single component, the direction of which is perpendicular to the main direction of the flow of the veil.

Thus, the air blown tangentially to the veil creates, very effectively, a rotational movement that makes it possible, by the centrifugal energy generated, to create a vortex, which expands the veil—the diameter of the veil increases and, when the veil drops onto the belt, it spreads out uniformly.

This device for blowing air uniformly around the circumference of the veil of fibers does not cause local perturbations within the veil, unlike the devices of the prior art. From experience, it is found that this device provides more reliable control, whereas the blowing devices of the prior art may result in more unstable conditions that are difficult to control.

The more uniform distribution allows the density of the felt to be reduced—the product is therefore lighter and less expensive to produce, while maintaining the same insulation properties. The reduction in density also makes it possible, for the same output of attenuable molten material, to increase the quantity of felt produced.

According to one feature, the blowing means deliver air at a velocity of 5 to 40 m/s, which may nevertheless vary from 1 to 45 m/s and may advantageously be around 10 to 30 m/s. The supply pressure for blowing the air is at most 60 mmWC and may however range up to 350 mmWC. It will be recalled that 1 mmWC corresponds to 9.81 Pa.

This system thus consumes little energy owing to the fact that it uses air at low pressure (less than 60 mmWC). Thus, this tangential blowing of air at low velocity and at low pressure allows the jet of fibers to be expanded from the inside toward the outside without making holes in the structure of the fibrous veil, while minimizing the formation of strands unfavorable to the structure of the product.

According to another feature, the blowing means consist of an annular chamber that has a solid external wall and a partially open internal wall intended to surround the tubular veil, the external wall having at least one air intake and the internal wall having partial blocking fins.

Preferably, the annular chamber is supplied via a plurality of, for example three or four, air intakes, it being possible for the pressure of the air emanating from each intake to be adjusted in order to introduce either air blown homogeneously over the entire periphery or, if required, pressure differences around the periphery of the chamber in order to correct dissymmetries in the flow of the fibrous veil, compensating by different air velocities per sector.

According to another feature, the fins, which in particular can be pivoted, are oriented at an opening angle of preferably between 15 and 25°, which may however be up to 40° and is preferably between 20 and 30°.

Preferably, the internal wall is lined with an annular lining facing the veil and extending over at least part of the height of the fins. This lining constitutes an additional means for regulating the air intake opening section tangential to the veil.

Optionally, the annular chamber includes an annular grid for distributing the air through the internal wall facing the fins.

Advantageously, the device includes at least one flared tubular extension wall that extends from one side of the annular chamber (on the downstream side in the mounted position of the device), the wall being intended to diffuse the tubular veil output by the blowing means.

Another flared tubular extension wall may be provided, this extending on the opposite side from the first extension wall, on the other side from the annular chamber (on the upstream side in the mounted position of the device), and is intended to guide the tubular veil on entering the blowing means.

The invention also relates to an installation for forming fibrous felts that includes a device for the centrifugation of an attenuable material, which is provided with a fiberizing dish delivering filaments of said material, an inductor, which is placed beneath the centrifugation device, and a gas attenuation device that delivers a high-temperature gas stream that converts the filaments into fibers in the form of a substantially tubular veil, the installation being characterized in that it includes a device for improving the distribution of the fibers according to the invention, which device is placed immediately beneath the inductor or else at some distance from the inductor.

Preferably, in particular when the device is placed beneath the inductor, it is made of a heat-resistant material that does not pick up the magnetic field generated by the inductor.

According to one feature, the distance separating the device from the inductor is around 0.5 to 1.5 times the diameter of the fiberizing dish. However, the device may be immediately beneath the inductor and even affixed thereto.

The installation may include a binder supply device, that is placed downstream of the device for improving the distribution of the fibers.

The terms "upstream" and "downstream" in the rest of the description must be understood as being the lower parts and upper parts respectively of an element with respect to part of the installation which, installed for its operation, receives the flow of material to be fiberized from the top downward.

Finally, the invention relates to a process for manufacturing a fibrous felt using the device of the invention for improving the distribution of the fibers in the felt.

BREIF DESCRIPTION OF THE DRAWINGS

Other advantages and features of the invention will now be described in greater detail with regard to the appended drawings in which.

DETAILED DESCRIPTION OF THE INVENTION

The representations illustrated in the figures are schematic, these not being drawn strictly to scale in order to make them easier to understand.

Figure 1:
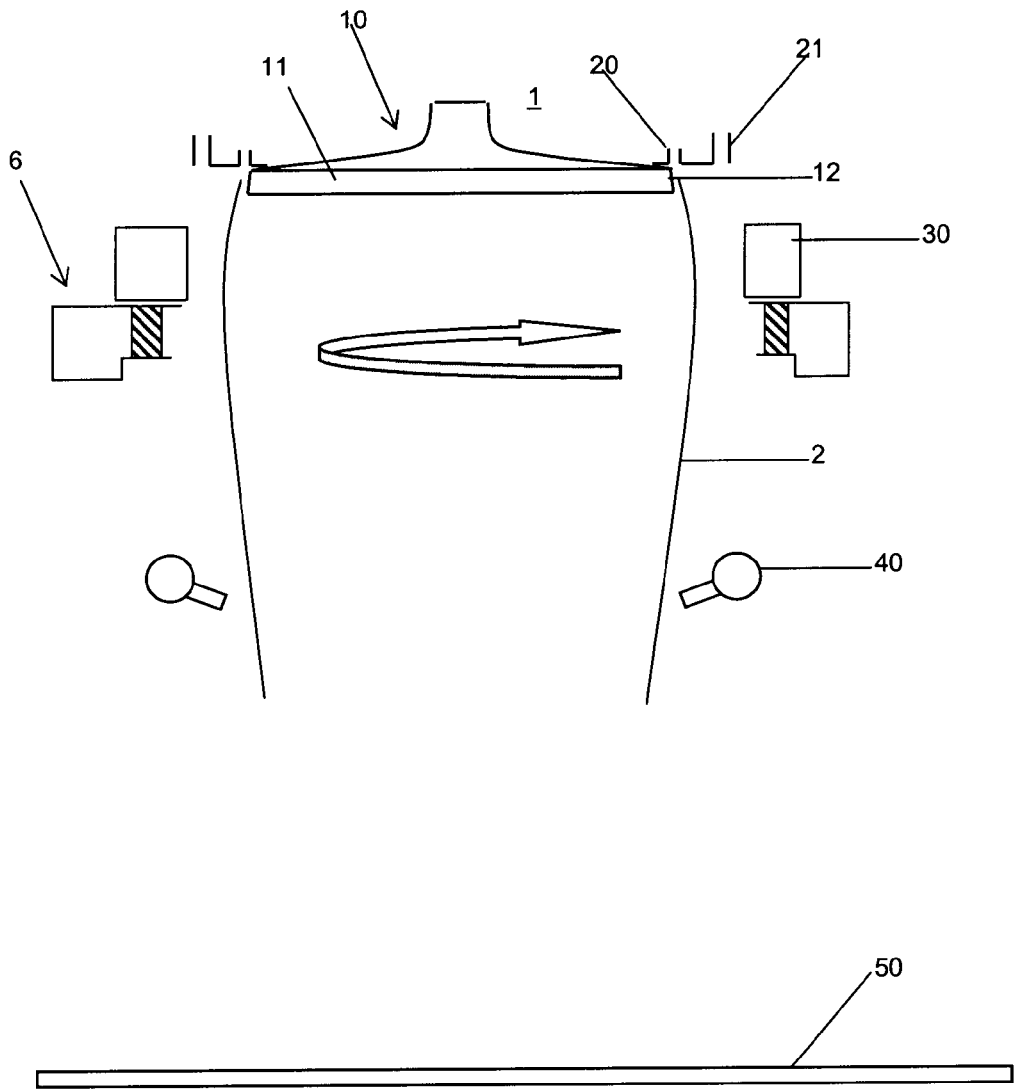
FIGS. 1 and 2 show schematic partial sectional views of two respective embodiments of installations for forming fibrous felts that include a device for improving the fiber distribution according to the invention.
Figure 2:
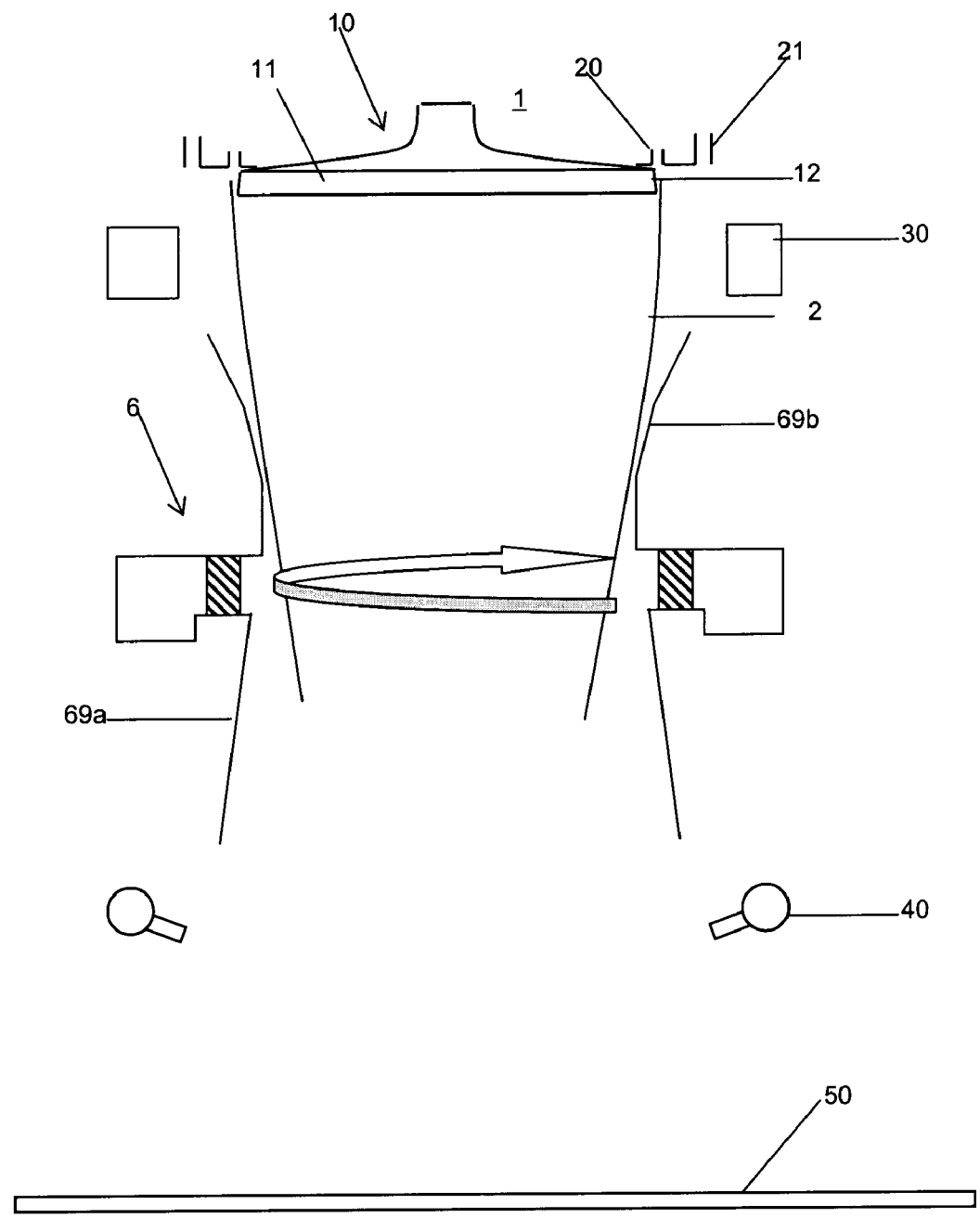

FIGS. 1 and 2 show partial views, in cross section and in a vertical plane, of two respective embodiments of an installation for forming fibrous felts comprising the device 6 of the invention, the arrangement of which differs in particular from one embodiment to the other.

An installation 1 comprises, in a manner common to both figures, and in a known manner from upstream to downstream, or from the top down, along the direction of flow of the attenuable material in the melt state, an internal centrifugation device 10 that delivers filaments of an attenuable material, an attenuation device 20 delivering a gas stream that converts the filaments into fibers, an annular inductor 30 placed beneath the centrifugation device 10, a binder supply device 40, and a belt 50 for receiving the fibers, on which the fibers accumulate so as to form the felt.

The centrifugation device 10 comprises a spinner 11, also called a fiberizing dish, rotating at high speed and pierced around its peripheral wall by a very large number of holes via which the molten material is ejected in the form of filaments owing to the centrifugal force.

The attenuation device 20 comprises an annular burner that delivers a gas stream at high temperature and high velocity, which hugs the wall 12 of the spinner. This burner serves to maintain the high temperature of the wall of the spinner and contributes to the attenuation of the filaments in order to convert them into fibers, which fall in the form of a substantially tubular veil 2.

The attenuating gas stream is generally channeled by means of an enveloping cold gas sheath. This gas sheath is produced by a blowing ring 21 that surrounds the annular burner. Being cold, this gas sheath also helps to cool the fibers, the mechanical strength of which is thus improved by a thermal quenching effect.

The annular inductor 30 heats the underside of the centrifugation device in order to help to maintain the thermal equilibrium of the fiberizing dish.

The binder supply device 40 consists of a ring through which the tubular veil of fibers flows. The ring includes a multiplicity of nozzles spraying the veil of fibers with binder.

The veil of fibers is then deposited on the receiving belt 50.

To improve the distribution of the fibers on the belt, the installation includes the device 6 of the invention, this being placed beneath the attenuation device and the inductor. This device consists of means for blowing or blasting low-pressure air in a direction tangential and perpendicular to the flow of the fibrous tubular veil so as to impress thereon an energetic rotational movement so that a vortex develops around the axis of the veil, the veil then no longer being tubular but progressively flaring. This vortex thus results in a homogeneous expansion of the fibrous jet, making it possible for the fibers to be uniformly spread out over the width of the receiving belt 50.

The air ejection means deliver air at a velocity which may vary from 1 to 45 m/s. This velocity is in particular obtained from air blown at low pressure, that is to say at a pressure of at most 350 mmWC.

In a first embodiment illustrated in the installation shown in FIG. 1, the air ejection means 6 are placed just beneath the inductor 30. The means 6 in this embodiment are made of a heat-resistant material that does not pick up the magnetic field generated by the inductor.

The means 6 consist of an annular chamber that surrounds the fibrous veil 2.

Figure 3:
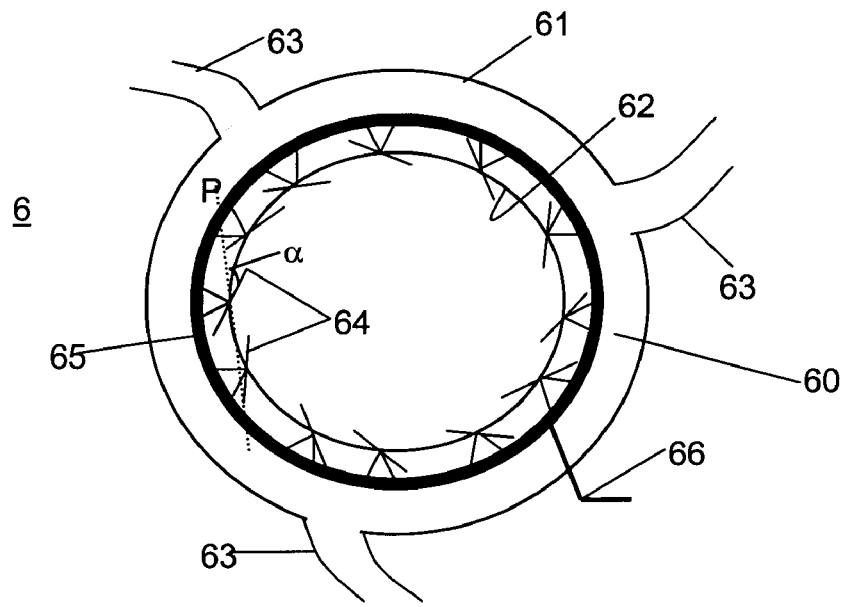
FIG. 3 illustrates a detailed sectional view from above the improvement device according to the invention.

This annular chamber, which can be seen from above in FIG. 3, has an external wall 61 and an internal wall 62 that define an annular cavity 60 into which the air enters via the external wall and by means of which, via the internal wall, the air is supplied tangentially and perpendicularly to the tubular veil 2.

The external wall 61 includes at least one air supply orifice 63, for example three or four orifices that are advantageously placed equidistantly around the periphery of the chambers so as to homogenize the volume of air entering the cavity 60.

Advantageously, upstream of each of the supply orifices, individual pressure regulating means (not shown here) will be provided so as to adjust the exit velocity of the air from each of the orifices, so that pressure differences may be generated around the periphery of the chamber in order to correct, if required, any imbalances around the periphery that may result in distribution defects within the fibrous veil.

The internal wall 62 is partly open—it is closed off by means of fins 64 that are suitably oriented so as to control the velocity and the direction of the exiting air.

The fins 64 are fixed to the wall at at least two points aligned along an axis parallel to the walls 61 and 62. They are kept in a fixed position at a chosen angle of inclination or an opening angle α with respect to the plane P tangential to the points of attachment of a fin, this angle being between 15 and 40° and preferably between 20 and 30°.

The fins are either fastened to the cavity 60 in a specified position or, in a variant, they are capable of pivoting about the axis that passes through their points of attachment to the wall so as to control the desired angle of inclination α.

The pivoting of the fins 64 is achieved by their being fastened to an annular element 65, such as a disk, which is placed in the cavity 60 and is designed to rotate. This disk is connected to a gripping member 66 which lies outside the external wall 62 and the actuation of which allows the disk to rotate. The gripping member is combined with means (not illustrated) for preventing the disk from rotating.

The fins allow the variation in closure area of the internal wall 62 to be controlled, with consequently a variation in the velocity and the direction of supply of air around the fibrous veil. The higher the angle of inclination α, that is to say the less closed the internal wall, the less the air is accelerated when it emerges from the glass veil. The lower the angle of inclination α, the fins therefore being oriented the most tangentially possible to the internal wall 62, the greater the acceleration of the air arriving at the glass veil.

Furthermore, the velocity of the air is also controlled by the air supply pressure.

The air delivered as output from the fins is around 1 to 45 m/s.

Optionally, an annular air distribution grid 67 (FIG. 4), for example made of perforated sheet, may be envisaged in the cavity 60 opposite the fins 64, depending on the number of supply orifices 63 provided, so as to optimize the uniformity of air blowing at the fins.

Furthermore, it may be preferable to add, opposite and at the outlet of the fins, in the direction of the veil, a height-adjustable annular lining 68 which makes it possible for the upper part of the fins to be partly blocked off. This lining constitutes another means of adjusting the opening of the wall in order to regulate the delivery velocity of the air.

In the embodiment shown in FIG. 2, the improvement device 6 is similar to that shown in FIG. 1, being however placed at a certain distance from the inductor 30 but remaining upstream of the binder spray device 40. The distance separating the device 6 from the inductor is around 0.5 to 1.5 times the diameter of the fiberizing dish.

Figure 4:
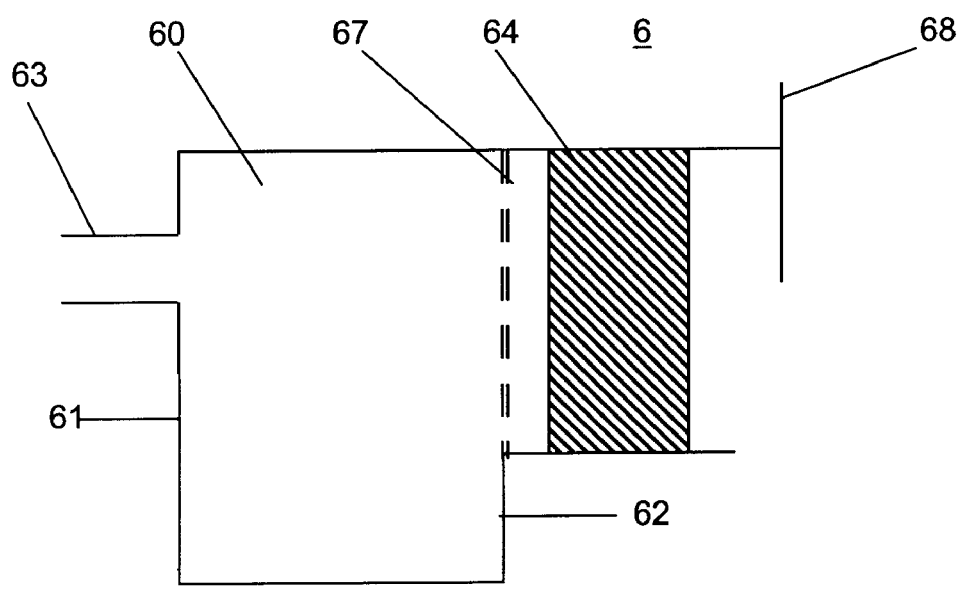
FIG. 4 shows a vertical sectional view of an embodiment of the improvement device.

The device 6 has the same elements as the device described in FIGS. 1, 3 and 4.

However, because of its distance from the inductor 30, there is necessarily no requirement for it to be made of the same material with a very high heat resistance and not picking up the magnetic field—for example it is made of stainless steel.

Furthermore, it preferably comprises flared tubular extension walls 69a and 69b that extend on either side of the annular chamber substantially in the direction of the tubular fibrous veil, respectively upstream in order to channel the fibrous veil and respectively downstream in order to diffuse the veil towards the receiving belt. Thus, the upstream wall 69b is flared toward the top of the installation, whereas the downstream wall 69a is downwardly flared.

In the embodiments shown in FIGS. 1 and 2, the orientation of the fins is adjusted according to the velocity and the direction to be given to the air arriving around the glass veil in order to expand it, the velocity being different depending on the height position of the improvement device 6, that is to say close to or further away from the attenuation device.

Figure 5:
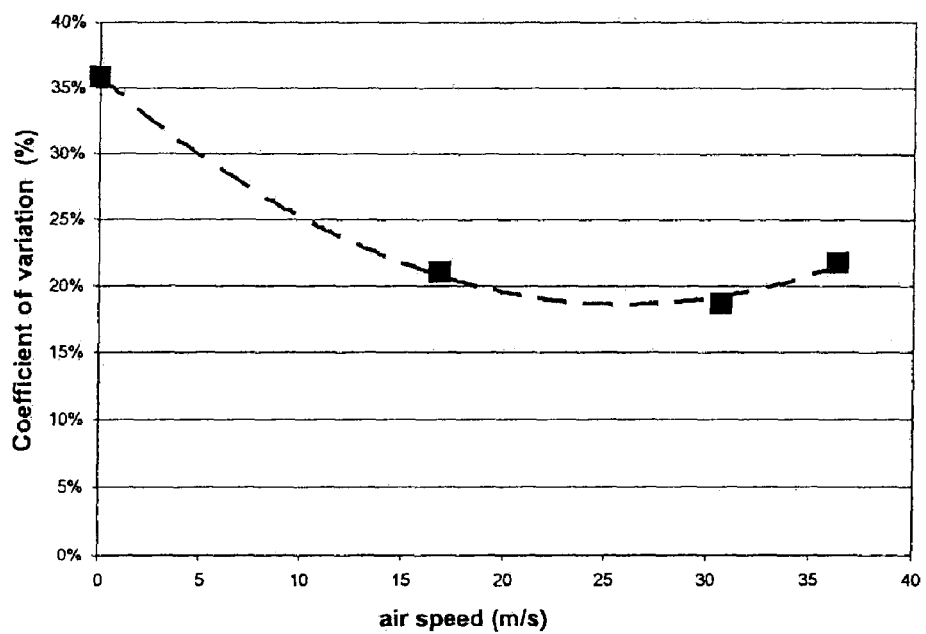
FIG. 5 shows a curve of the coefficient of variation of the mass per unit area of a felt as a function of the velocity of the air ejected by the device of the invention.

FIG. 5 illustrates a curve of the coefficient of variation of the mass per unit area of a felt as a function of the velocity of the air expelled by the means 6. This curve is obtained in a pilot installation according to the embodiment shown in FIG. 2. Here, the velocity of the air is varied by adjusting the air supply pressure.

The formation installation delivered a web 1400 mm in width. Seven strips 200 mm in width and 300 mm in length were cut and their weights measured.

The average of the seven measured weights and the standard deviation of these measurements were also calculated.

The coefficient of variation in the case of the width of the cut web was then calculated by the ratio of the standard deviation to the average of the weights.

Samples of the web were taken for four measured values of the projected air velocity between 0 and 37 m/s.

When the device of the invention is not operating (velocity equal to 0 m/s), the coefficient of variation is around 35%. This is because, with no air flowing, the extension walls 69a and 69b concentrate the fibers at the center of the felt, giving a higher coefficient of variation.

When the device of the invention is in operation, by adjusting the velocity of the air between 20 and 30 m/s, it is found that the coefficient of variation is now only around 17%.

This reduction in the coefficient of variation using the device results in better distribution of the fibers and therefore a reduction in the density of the felt produced using the device of the invention.

The invention claimed is:

1. A device that is used in the formation of fibrous felts, fibers of the fibrous felts including a material that is attenuable by internal centrifugation and by an attenuation device via a gas stream, a flow of the fibers being in the form of a tubular veil, the device comprising:
an air blower located beneath the attenuation device, the air blower expelling air tangentially to the tubular veil to impress a rotational movement on the veil and supplying air in a direction perpendicular to a main direction of the flow of the tubular veil, wherein a velocity of the air supplied in the direction perpendicular to the main direction of the flow has a single component, the air blower including an annular chamber including an external wall and a partially open internal wall disposed radially inward of the external wall and that surrounds the tubular veil, the external wall including at least one air intake and the partially open internal wall including partial blocking fins.

2. The device as claimed in claim 1, wherein the air blower delivers air at approximately 1 to 45 m/s.

3. The device as claimed in claim 1, wherein the external wall is solid.

4. The device as claimed in claim 1, wherein the annular chamber is supplied via a plurality of air intakes, such that a pressure of air emanating from each of the plurality of intakes is adjustable to provide pressure differences around a periphery of the annular chamber.

5. The device as claimed in claim 1, wherein the partial blocking fins are pivotable.

6. The device as claimed in claim 5, wherein the partial blocking fins are oriented at an opening angle of between 15 and 40° relative to respective planes that are tangential to points of attachment of the partial blocking fins to the internal wall.

7. The device as claimed in claim 1, wherein the partially open internal wall is lined with an annular liner facing the veil and extending over at least part of a height of the partial blocking fins.

8. The device as claimed in claim 1, wherein the annular chamber includes an annular grid that distributes the air through the partially open internal wall facing the partial blocking fins.

9. The device as claimed in claim 1, further comprising at least one tubular flared extension wall that extends from one side of the annular chamber, wherein the at least one tubular flared extension wall diffuses the tubular veil leaving the air blower.

10. The device as claimed in claim 9, further comprising another flared tubular extension wall that extends from a side of the annular chamber opposite to the one side of the annular chamber, wherein the other flared tubular extension wall guides the tubular veil on entering the air blower.

11. The device as claimed in claim 1, wherein the partial blocking fins are angled relative to respective planes that are tangential the internal wall.

12. An installation that forms fibrous felts comprising:
a centrifugation device to centrifuge an attenuable material that is provided with a fiberizing dish delivering filaments of the attenuable material,
an inductor which is placed beneath the centrifugation device,
a gas attenuation device that delivers a high-temperature gas stream that converts the filaments into fibers in the form of a tubular veil, and
a device that improves the distribution of the fibers located beneath the gas attenuation device, the device including an air blower that expels air tangentially to the tubular veil to impress a rotational movement on the veil and supplies air in a direction perpendicular to a main direction of the flow of the tubular veil, wherein a velocity of the air supplied in the direction perpendicular to the main direction of the flow has a single component, the air blower including an annular chamber including an external wall and a partially open internal wall that surrounds the tubular veil, the external wall including at least one air intake and the partially open internal wall including partial blocking fins,
wherein the device that improves the distribution of fibers is placed immediately beneath the inductor or at a distance downstream of the inductor.

13. The installation as claimed in claim 12, wherein the device that improves the distribution of fibers is comprised of a heat-resistant material that is non-magnetic, such that the heat-resistant material is not influenced by a magnetic field generated by the inductor.

14. The installation as claimed in claim 13, wherein the distance separating the device that improves the distribution of fibers from the inductor ranges up to 1.5 times the diameter of the fiberizing dish.

15. The installation as claimed in claim 12, further comprising a binder supply device that is placed downstream of the device that improves the distribution of the fibers.

16. The installation as claimed in claim 12, wherein the air blower delivers air at approximately 1 to 45 m/s.

17. The installation as claimed in claim 12, wherein the annular chamber is supplied via a plurality of air intakes, such that a pressure of air emanating from each of the plurality of intakes is adjustable to provide pressure differences around a periphery of the annular chamber.

18. The installation as claimed in claim 12, wherein the partial blocking fins are pivotable.

19. The installation as claimed in claim 18, wherein the partial blocking fins are oriented at an opening angle of between 15 and 40° relative to respective planes that are tangential to points of attachment of the partial blocking fins to the internal wall.

20. The installation as claimed in claim 12, wherein the partially open internal wall is lined with an annular liner facing the veil and extending over at least part of a height of the partial blocking fins.

21. The installation as claimed in claim 12, wherein the annular chamber includes an annular grid that distributes the air through the partially open internal wall facing the partial blocking fins.

22. The installation as claimed in claim 12, further comprising at least one tubular flared extension wall that extends from one side of the annular chamber, wherein the at least one tubular flared extension wall diffuses the tubular veil leaving the air blower.

23. The installation as claimed in claim 12, further comprising another flared tubular extension wall that extends from a side of the annular chamber opposite to the one side of the annular chamber, wherein the other flared tubular extension wall guides the tubular veil on entering the air blower.

24. The installation as claimed in claim 12, wherein the partial blocking fins are angled relative to respective planes that are tangential to the internal wall.

25. A process to manufacture a fibrous felt comprising:

providing a device that is used in the formation of the fibrous felt, fibers of the fibrous felt including a material that is attenuable by internal centrifugation and by an attenuation device via a gas stream, a flow of the fibers being in the form of a tubular veil, the device including an air blower located beneath the attenuation device, the air blower expelling air tangentially to the tubular veil to impress a rotational movement on the tubular veil and supplying air in a direction perpendicular to a main direction of the flow of the tubular veil, wherein a velocity of the air supplied in the direction perpendicular to the main direction of the flow has a single component, the air blower including an annular chamber including an external wall and a partially open internal wall disposed radially inward of the external wall and that surrounds the tubular veil, the external wall including at least one air intake and the partially open internal wall including partial blocking fins, and improving the distribution of the fibers in the felt by using the device to expel air tangentially to the tubular veil to impress a rotational movement on the tubular veil and to supply air in a direction perpendicular to a main direction of the flow of the tubular veil.

* * * * *